(12) United States Patent
McSweeney et al.

(10) Patent No.: US 10,015,063 B1
(45) Date of Patent: Jul. 3, 2018

(54) METHODS AND APPARATUS FOR MONITORING AND AUDITING NODES USING METADATA GATHERED BY AN IN-MEMORY PROCESS

(71) Applicant: EMC IP Holding Company LLC, Hopkinton, MA (US)

(72) Inventors: Thomas J. McSweeney, Hoquiam, WA (US); Nicholas Weaver, North Richland Hills, TX (US); John Daniel Hushon, Medfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 658 days.

(21) Appl. No.: 13/731,509

(22) Filed: Dec. 31, 2012

(51) Int. Cl.
| | |
|---|---|
| *G06F 15/16* | (2006.01) |
| *H04L 12/26* | (2006.01) |
| *H04L 29/08* | (2006.01) |
| *G06F 12/00* | (2006.01) |

(52) U.S. Cl.
CPC ........ *H04L 43/00* (2013.01); *H04L 29/08072* (2013.01)

(58) Field of Classification Search
CPC ............... G06F 9/45558; G06F 9/5077; G06F 2009/45562; G06F 9/50; G06F 9/5083; G06F 15/177; G06F 1/3209; G06F 1/3287; G06F 11/1458; G06F 13/1689; G06F 13/1694; G06F 13/4022; G06F 15/7803; G06F 17/5022; G06F 17/5027; G06F 17/5054; G06F 1/24; G06F 21/577; G06F 2201/84; G06F 9/24

USPC .......................... 709/203, 217, 220, 223, 224
See application file for complete search history.

(56) References Cited

U.S. PATENT DOCUMENTS

| | | | | |
|---|---|---|---|---|
| 6,493,447 | B1 * | 12/2002 | Goss ..................... | H04L 29/06 370/352 |
| 7,113,934 | B2 * | 9/2006 | Levesque et al. ...... | H04L 41/20 |
| 7,325,046 | B1 * | 1/2008 | Novaes ................. | G06F 9/5061 709/201 |
| 7,466,659 | B1 * | 12/2008 | Kazar .................... | H04L 69/22 370/252 |
| 7,844,766 | B1 * | 11/2010 | Straitiff ................. | G06F 9/4416 710/72 |
| 2002/0169734 | A1 * | 11/2002 | Giel ....................... | G06Q 10/04 706/45 |
| 2003/0023957 | A1 * | 1/2003 | Bau, III .................. | G06F 8/20 717/140 |
| 2005/0044301 | A1 * | 2/2005 | Vasilevsky ........... | G06F 9/45533 711/1 |

(Continued)

*Primary Examiner* — Zarni Maung
(74) *Attorney, Agent, or Firm* — Ryan, Mason & Lewis, LLP

(57) ABSTRACT

A node is monitored using metadata gathered by an in-memory process. Metadata for the node is dynamically gathered using a process running in memory; and the gathered metadata is provided to a remote server for storage. The process comprises, for example, an in-memory micro-kernel executing on a boot node. The metadata comprises, for example, information about physical characteristics of the node, information about one or more software packages installed on the node and/or information about one or more of an operating system, a BIOS and firmware. The gathered metadata can be processed to update a finite state machine to indicate a state of the node and/or to detect a change in state of the node.

21 Claims, 4 Drawing Sheets

(56) References Cited

U.S. PATENT DOCUMENTS

| | | | |
|---|---|---|---|
| 2005/0080982 A1* | 4/2005 | Vasilevsky | G06F 3/0607 711/1 |
| 2005/0120160 A1* | 6/2005 | Plouffe | G06F 9/45537 711/1 |
| 2005/0289388 A1* | 12/2005 | Black-Ziegelbein | G06F 9/5061 714/6.32 |
| 2007/0240145 A1* | 10/2007 | Saroj | G06F 8/61 717/168 |
| 2009/0007098 A1* | 1/2009 | Chevrette | G06F 8/65 717/177 |
| 2009/0282101 A1* | 11/2009 | Lim | G06F 9/5077 709/203 |
| 2012/0084381 A1* | 4/2012 | Alladi | G06F 9/544 709/213 |
| 2012/0324041 A1* | 12/2012 | Gerber | H04L 67/26 709/217 |
| 2014/0012936 A1* | 1/2014 | Aikoh | G06F 12/0811 709/213 |

\* cited by examiner

100

500

400

US 10,015,063 B1

METHODS AND APPARATUS FOR MONITORING AND AUDITING NODES USING METADATA GATHERED BY AN IN-MEMORY PROCESS

FIELD OF THE INVENTION

The present invention relates generally to techniques for monitoring node configurations.

BACKGROUND OF THE INVENTION

Network booting, or boot-strapping, is the process of booting a computer from a network device rather than a local drive. During the network boot, one available strategy is to perform an operating system (OS) installation process. During the typical network boot initiated installation, there is limited visibility into the packages that were installed on a node and the configuration of the node once the network boot and OS installation process is complete. The boot process is typically driven by an OS Install script (either static or dynamic) that is supplied by the server, and most log files are stored to the local device making them unavailable to external participants. Once the script is delivered to the node that is going through the network boot process, however, there is typically little interaction between the node and the server that supplies the install packages (other than the exchange of the packages themselves).

Razor is a hardware provisioning solution for data centers developed by Puppet Labs and EMC Corp. Razor employs an in-memory instance of a microkernel executing on a node. The in-memory microkernel discovers the hardware on the node, such as central processing units, disks and memory, and reports the node inventory information to a Razor node state manager in real-time.

A need exists for methods and apparatus for monitoring a node during and after a boot process.

SUMMARY OF THE INVENTION

The present invention in the illustrative embodiments described herein provides techniques for monitoring a node using metadata gathered by an in-memory process. In accordance with an aspect of the invention, a method is provided for monitoring a node by dynamically gathering metadata for the node using a process running in memory; and providing the gathered metadata to a remote server for storage. The process comprises, for example, an in-memory microkernel executing on a boot node. The metadata comprises, for example, information about physical characteristics of the node, information about one or more software packages installed on the node and/or information about one or more of an operating system, a BIOS and firmware.

The gathered metadata can be processed to update a finite state machine to indicate a state of the node and/or to detect a change in state of the node. For example, the gathered metadata can be evaluated to determine if a state of the node violates one or more predefined security constraints. Another aspect of the invention reconciles the gathered metadata across a plurality of data domains. In one exemplary embodiment, the gathered metadata is analyzed to guide a state machine and/or an installation processes, for example, based on one or more operational policies.

The monitoring techniques of the illustrative embodiments overcome one or more of the problems associated with the conventional techniques, and provide improved node monitoring based on metadata gathered by an in-memory process during and/or after the boot process. These and other features and advantages of the present invention will become more readily apparent from the accompanying drawings and the following detailed description.

DETAILED DESCRIPTION

The present invention provides methods and apparatus for monitoring a node using metadata gathered by an in-memory process, preceding, during and after a boot process. Aspects of the present invention maintain the state of each node, for example, using a finite state machine, and evaluate the gathered metadata to detect a change in state of a node. For example, the gathered metadata can be evaluated to determine if a node state violates one or more predefined security constraints.

In this manner, when the state information is combined with other gathered data, a detailed audit can be generated indicating how each node is configured (in detail) over time. Such audit information is useful, for example, in environments that control what is installed on any node in the network, as well as in environments for which there is a requirement to maintain/perform an audit of the software installed on the nodes in the network, the services running in the network, and the configuration of those services (over time). Furthermore, this audit can optionally be used for licensure validation, understanding of state of node software at any point in time for vulnerability analysis, and even as a model itself to enable the regeneration of deployed state.

Figure 1:
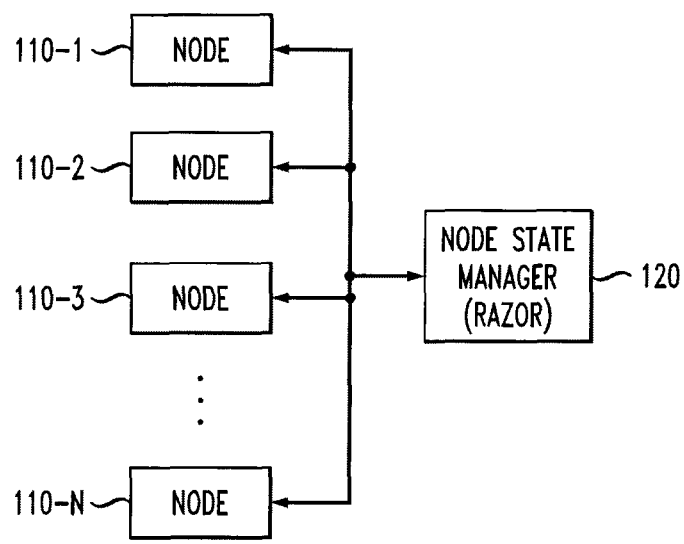
FIG. 1 is a schematic diagram illustrating an electronic environment in which the present invention can be implemented.

FIG. 1 is a schematic diagram illustrating an exemplary electronic environment 100 in which the present invention can be implemented. As shown in FIG. 1, the exemplary electronic environment 100 comprises a plurality of nodes 110-1 through 110-N (hereinafter, collectively referred to as nodes 110) that communicate with a node state manager 120, such as a Razor server.

As discussed hereinafter, during a network boot process, a node 110 contacts the node state manager 120 and the node state manager 120 discovers the node 110. The node state manager 120 sends a microkernel to execute in memory on the discovered node 110. The microkernel gathers metadata about the node 110 and provides the gathered metadata to the node state manager 120.

In accordance with aspects of the present invention, the gathered metadata is used to monitor and evaluate the state of each node 110.

Figure 2:
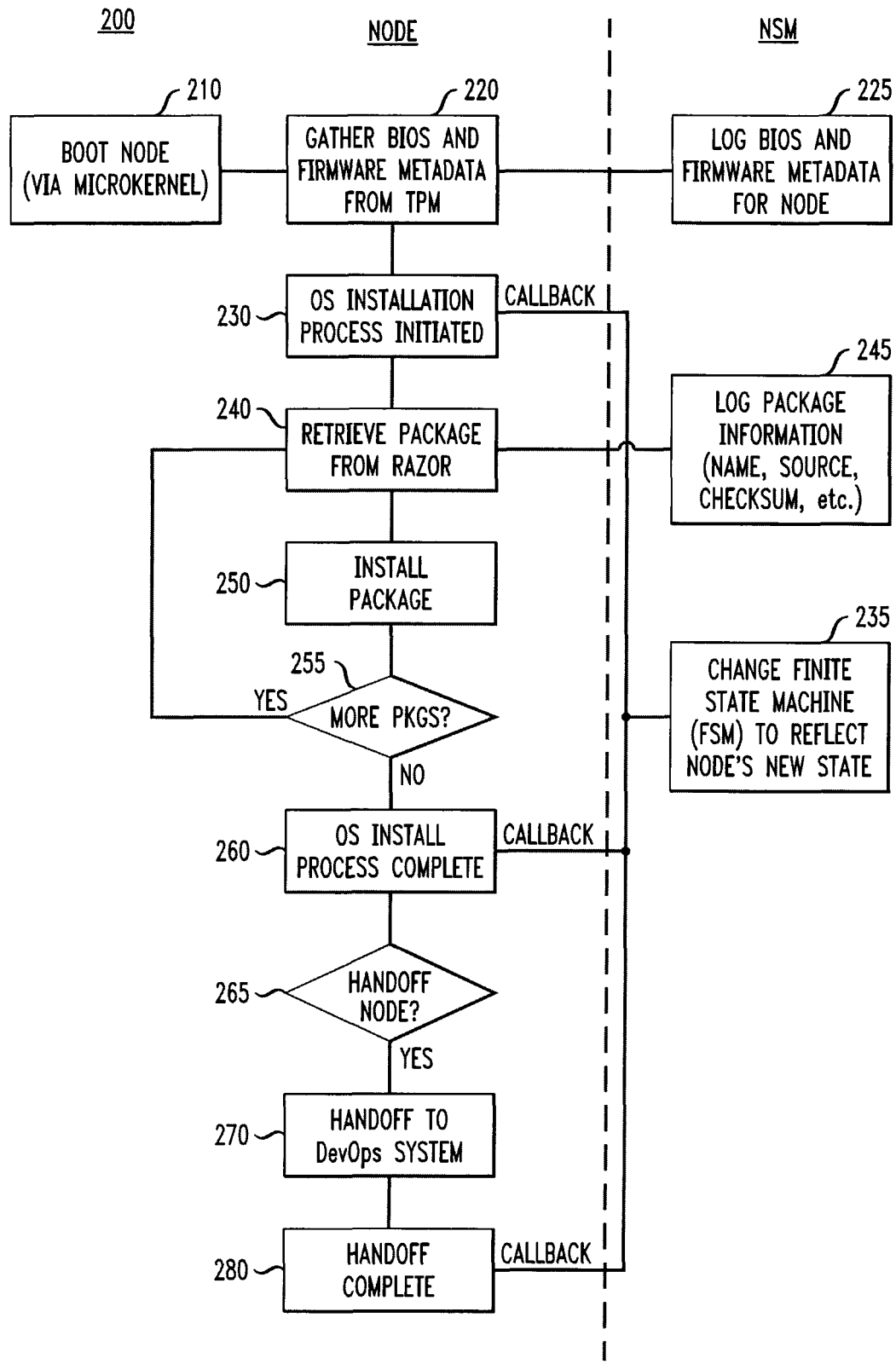
FIG. 2 is a flow chart illustrating an exemplary callback process for logging metadata and maintaining node state information in accordance with aspects of the present invention.

FIG. 2 is a flow chart illustrating an exemplary callback process 200 for logging metadata and maintaining node state information in accordance with aspects of the present invention. Generally, the exemplary callback process 200 employs callback messages from the installation process to the installation server (e.g., node state manager 120) during and after an OS installation to log BIOS and Firmware metadata and software package information and to maintain the node state using a finite state machine. It is noted that the operations on the left side of FIG. 2 are performed by a node 110 while the operations on the right side of FIG. 2 are performed by the node state manager 120. In this manner, the exemplary callback process 200 records each state transition for each node 110, as well as the software packages installed on each node 110 during the installation process.

As shown in FIG. 2, the exemplary callback process 200 is initiated in the Boot Node (via the microkernel) during step 210, as part of the boot process. Thereafter, the microkernel gathers BIOS and Firmware metadata about the node 110 during step 220 and the BIOS and Firmware meta-data for the node are logged during step 225.

The OS installation process is initiated during step 230, which triggers a callback message that changes the finite state machine (FSM) during step 235 to reflect the new state of the node. It is noted that the exemplary FSM is dynamic. The dynamic process is guided by a set of analytics that can be attached to key state transition/decision points to reason on success/failure or any other condition that might force a specific "next step" to be performed. The ability to reconcile key information across the audit stores/logs/databases enables querying holistically; in order to make the informed decisions to instantiate a given function in the data center. Whether guided by regulatory, corporate policy, or contract, these policies can be difficult to reconcile in an auditable way. The detailed audit logging provided by aspects of the present invention can substantially improve existing post-facto mechanisms.

During the OS installation process, the package is retrieved from the node state manager 120 (e.g., Razor) during step 240. The package information (e.g., name, source, checksum, etc.) is logged during step 245. The package is installed during step 250.

A test is performed during step 255 to determine if there are more packages to install. If it is determined during step 255 that there are more packages to install, then program control returns to step 240 to install the packages. If, however, it is determined during step 255 that there are no more packages to install, then the OS install process is completed during step 260, which triggers a callback message to change the FSM during step 235.

A test is performed during step 265 to determine if the node should be handed off to a Development-Operations (DevOps) system. If it is determined during step 265 that the node should be handed off to a DevOps system, then the handoff is performed during step 270, and the handoff is completed during step 280, triggering another callback message to change the FSM during step 235.

Once the handoff is complete, program control can optionally return to step 210 so that the node 110 can be rebooted into the Microkernel (in Razor, this is done by simply removing the "active_model" that was bound into the node and rebooting it) and the process can be repeated again.

Figure 3:
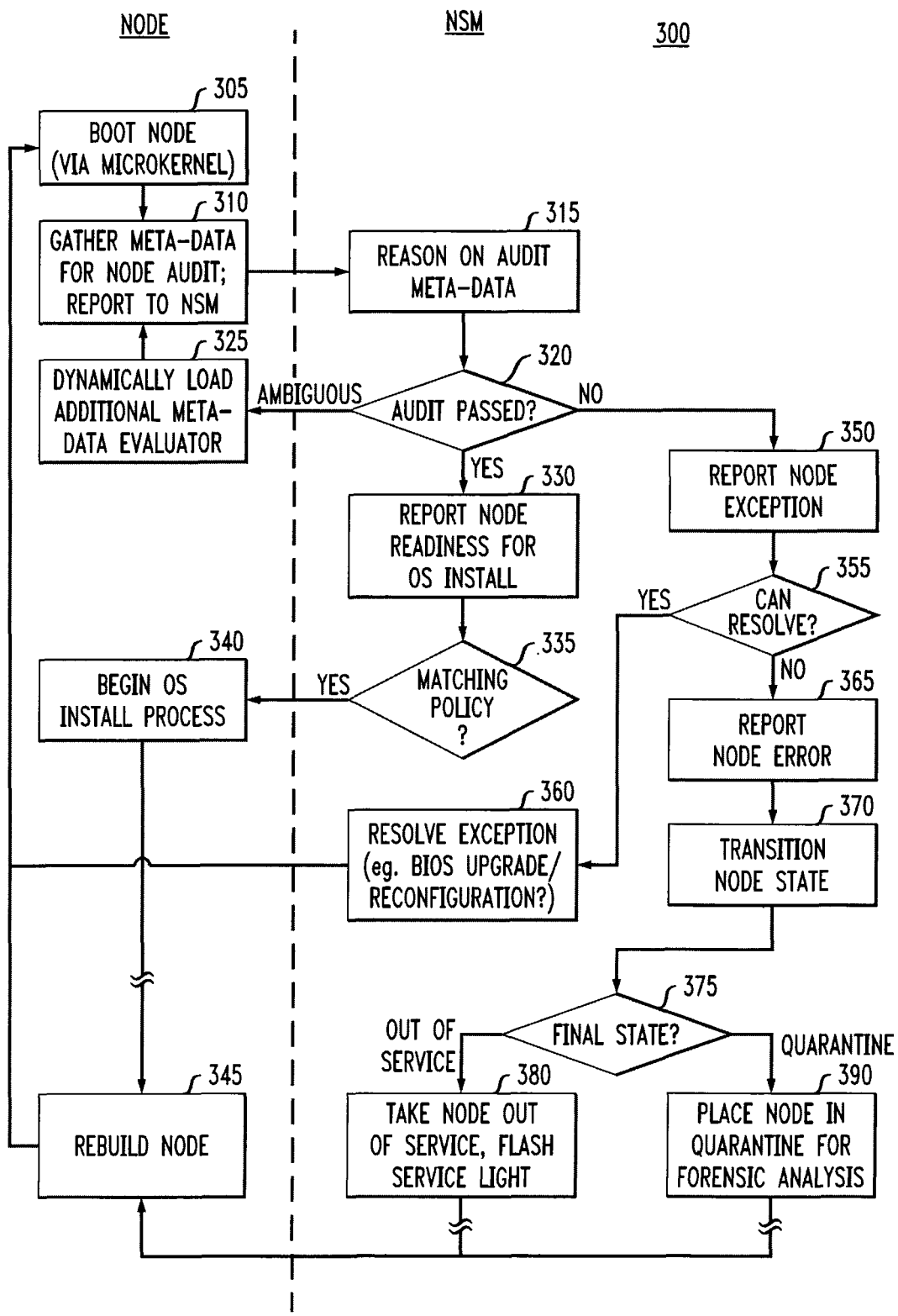
FIG. 3 is a flow chart illustrating an exemplary metadata evaluation process for detecting a change in a state of a node in accordance with aspects of the present invention.

FIG. 3 is a flow chart illustrating an exemplary metadata evaluation process 300 for detecting a change in a state of a node in accordance with aspects of the present invention. Generally, the exemplary metadata evaluation process 300 gathers and evaluates BIOS and Firmware related metadata to detect changes in the state of a node.

As shown in FIG. 3, the exemplary metadata evaluation process 300 is initiated in the Boot Node (via the microkernel) during step 305, as part of the boot process. Thereafter, the microkernel gathers metadata for a node audit during step 310, which is provided to the node state manager 120 and processed by the node state manager 120 during step 315 to reason on the audit metadata.

A test is performed during step 320, to determine if the audit passed. For example, the gathered metadata can be evaluated to determine if a node state violates one or more predefined security constraints. If it is determined during step 320 that the audit result is ambiguous, then program control proceeds to step 325 where the node 110 dynamically loads an additional metadata evaluator. If it is determined during step 320 that the audit has passed, then program control proceeds to step 330 where the node state manager 120 reports the readiness of the node 110 for an OS installation.

A test is performed during step 335, to determine if there is a matching policy for the OS install on the node 110. If it is determined during step 335 that there is a matching policy, then the OS installation process is initiated on the node 110 during step 340. At some future time, the node 110 is rebuilt during step 345 which causes program control to return to step 305 and continues in the manner described above.

If, however, it is determined during step 320 that the audit did not pass, then the node exception is reported during step 350. A test is performed during step 355 to determine if the exception can be resolved. If it is determined during step 355 that the exception can be resolved, then the node state manager 120 resolves the exception during step 360 (e.g., by performing a BIOS upgrade/reconfiguration) and then program control returns to step 305 and continues in the manner described above If, however, it is determined during step 355 that the exception cannot be resolved, then the node state manager 120 reports the node error during step 365 and transitions the node state during step 370.

A test is performed during step 375, to determine the appropriate final state for the node 110. If it is determined during step 375 that the node should be placed into an out-of-service state, for example, then the node 110 is taken out of service during step 380 and the service light on the node 110 is flashed.

If, however, it is determined during step 375 that the node should be place into a quarantine state, for example, then the node 110 is placed into a quarantine state during step 390 and the node 110 is held in this state for further forensic analysis.

Following steps 380 or 390 (once corrective action has been taken to resolve the error condition in the out-of-service node 110 or the forensic analysis of the quarantined node 110 has been completed, respectively), a rebuild of the node 110 can be triggered (step 345) which causes program control to return to step 305 and continues in the manner described above.

Figure 4:
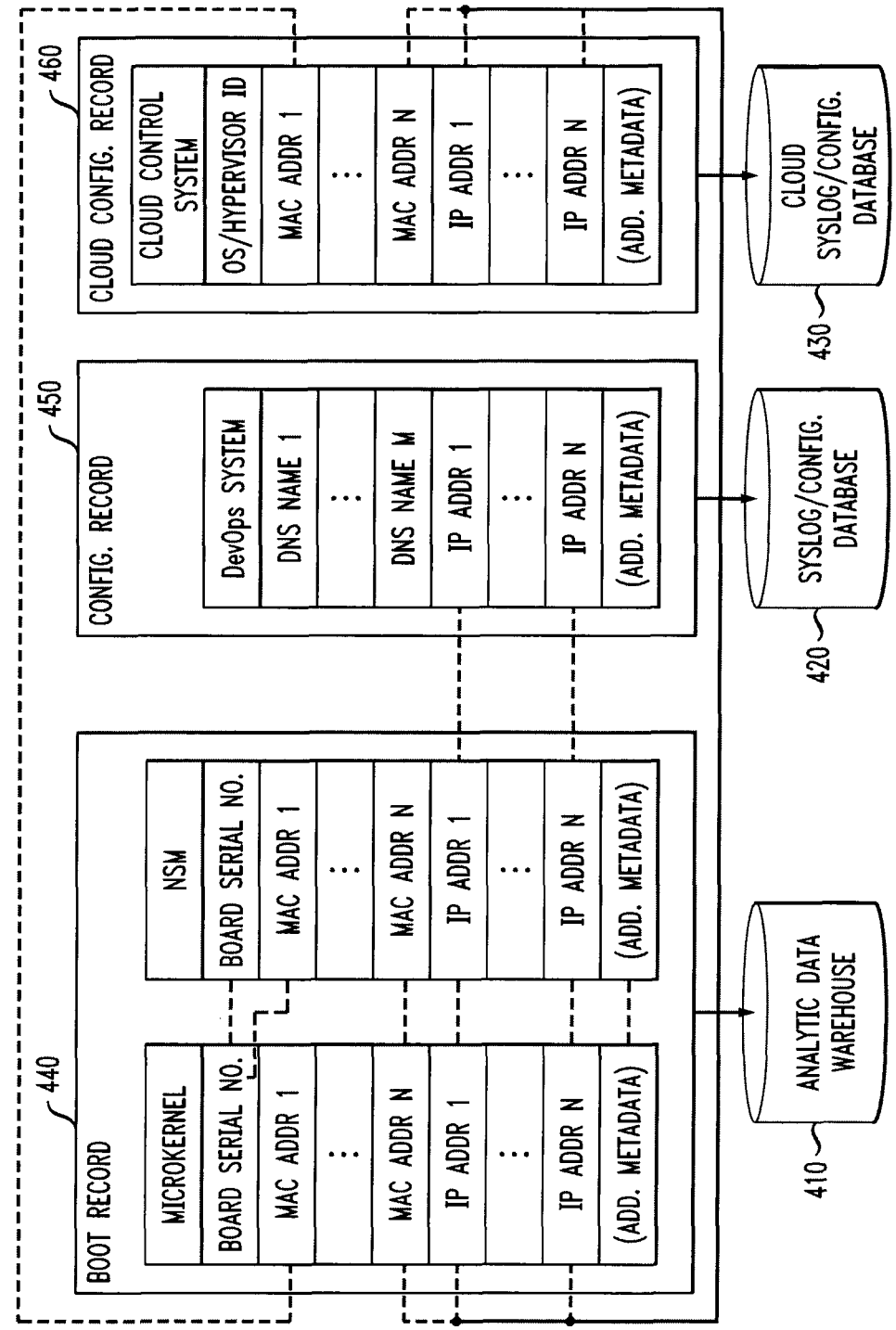
FIG. 4 is a flow chart illustrating an exemplary metadata linkage process for maintaining node state information across a plurality of domains in accordance with aspects of the present invention.

FIG. 4 is a flow chart illustrating an exemplary metadata linkage process 400 for maintaining node state information across a plurality of domains 410, 420, 430 in accordance with aspects of the present invention. As shown in FIG. 4, in one exemplary embodiment, data that is gathered using the exemplary callback process 200 and exemplary metadata evaluation process 300 of FIGS. 2 and 3 are stored in an analytic data warehouse 410, a syslog/configuration database 420 and a cloud syslog/configuration database 430.

One aspect of the present invention recognizes that it is challenging to track the data for a given node across the plurality of domains and/or sub-systems, which may represent, for example, virtual, logical and physical environments. As shown in FIG. 4, the information collected by the microkernel and the node state manager 120 is stored in a boot record 440 that is stored in the analytic data warehouse 410. The DevOps information is stored in a configuration record 450 in the syslog/configuration database 420. Cloud controller information is stored in a cloud control record 460 in the cloud syslog/configuration database 430.

Aspects of the present invention recognize that the metadata gathered in the boot record 440 is different than the metadata gathered by the DevOps system and stored in the configuration records 450 and the metadata gathered by the Cloud Control System and stored in the cloud control records 460. One aspect of the present invention uses the metadata gathered in the boot record 440 to link all three of those data sources together and reason over them during the audit process.

In this manner, the node state manager 120 can reason across one or more databases or stores to resolve the identity of a node 110 across the virtual, logical and physical environments.

The dashed lines in FIG. 4 identify an exemplary linkage between the key fields of each record 440, 450, 460 gathered by the microkernel and the source that they are gathered from. FIG. 4 also illustrates a recursive nature of the association between the boot record 440 and the cloud configuration record 460. In general, the recursion is incurred because the information in the boot record 440 is being gathered both when the hypervisor is deployed to the nodes 110 being managed by the cloud control system and when the OS instances are deployed to the tenant virtual machines (VMs) that are created and deployed into that hypervisor environment (the hypervisor is the "host" that the tenant VMs will be deployed to).

Figure 5:
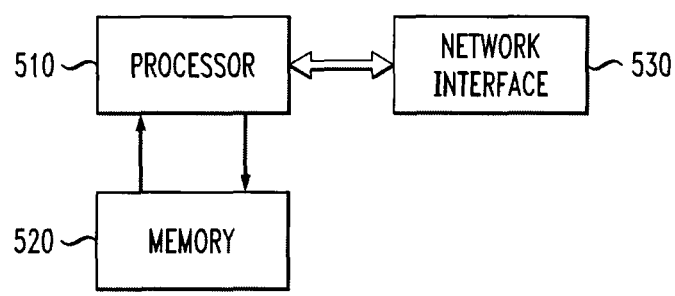
FIG. 5 illustrates one possible implementation of a node or node state manager of the exemplary network environment of FIG. 1.

FIG. 5 shows one possible implementation of a given processing device 500 of the FIG. 1 exemplary electronic environment 100. The processing device 500 as shown may be viewed as representing, for example, a node 110 or node state manager 120. The processing device 500 in this implementation includes a processor 510 coupled to a memory 520 and a network interface 530. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 520 and executed by the corresponding processor 510. The memory 520 is also used for storing information used to perform computations or other operations associated with the disclosed authentication techniques.

While various embodiments of the invention have been particularly shown and described, it will be understood by those skilled in the art that various changes in form and details may be made therein without departing from the spirit and scope of the invention as defined by the appended claims.

In some arrangements, node state manager 120 is implemented by a set of processors or other types of control/processing circuitry running software. In such arrangements, the software instructions can be delivered to node state manager 120 in the form of a computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

As mentioned previously herein, the above-described embodiments of the invention are presented by way of illustrative example only. Numerous variations and other alternative embodiments may be used. Additional details regarding certain conventional cryptographic techniques referred to herein may be found in, e.g., A. J. Menezes et al., Handbook of Applied Cryptography, CRC Press, 1997, which is incorporated by reference herein.

The illustrative embodiments of the invention as described herein provide improved monitoring of nodes in a network environment. Advantageously, the illustrative embodiments do not require changes to existing communication protocols. It is therefore transparent to both existing applications and communication protocols.

It should again be emphasized that the particular authentication techniques described above are provided by way of illustration, and should not be construed as limiting the present invention to any specific embodiment or group of embodiments. Also, the particular configuration of system elements shown in the figures and their interactions may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for monitoring a node by a remote node state manager, comprising:
   during a network boot process of said node, obtaining a microkernel process from said remote node state manager;
   dynamically gathering, using at least one processing device, metadata about said node from said node using said microkernel process running in memory of said node during said network boot process of said node; and
   providing, using at least one processing device associated with said microkernel, said metadata gathered by said microkernel process to said remote node state manager for storage.

2. The method of claim 1, wherein said metadata comprises information about physical characteristics of said node.

3. The method of claim 1, wherein said metadata comprises information about one or more software packages installed on said node.

4. The method of claim 1, wherein said metadata comprises information about one or more of an operating system, a BIOS and firmware.

5. The method of claim 1, wherein said step of providing said gathered metadata to said remote node state manager for storage comprises a callback message to said remote node state manager.

6. The method of claim 1, further comprising the step of updating a finite state machine to indicate a state of said node.

7. The method of claim 1, further comprising the step of evaluating said gathered metadata to detect a change in state of said node.

8. The method of claim 7, further comprising the step of reconciling said gathered metadata across a plurality of data domains.

9. The method of claim 7, further comprising the step of evaluating said gathered metadata to determine if a state of said node violates one or more predefined security constraints.

10. The method of claim 9, wherein said evaluation of said gathered metadata is performed across a plurality of data domains.

11. The method of claim 1, wherein said gathered metadata is analyzed to guide one or more of a state machine and an installation process.

12. The method of claim 11, wherein said analysis is defined by one or more operational policies.

13. A non-transitory machine-readable recordable storage medium for monitoring a node, wherein one or more software programs when executed by one or more processing devices implement the steps of the method of claim 1.

14. An apparatus for monitoring a node by a remote node state manager, the apparatus comprising:
a memory; and
at least one processing device, coupled to the memory, operative to implement the following steps:
during a network boot process of said node, obtaining a microkernel process from said remote node state manager;
dynamically gathering, using said at least one processing device, metadata about said node from said node using said microkernel process running in memory of said node during said network boot process of said node; and
providing said metadata gathered by said microkernel process to said remote node state manager for storage.

15. The apparatus of claim 14, wherein said metadata comprises one or more of information about physical characteristics of said node, information about one or more software packages installed on said node and information about one or more of an operating system, a BIOS and firmware.

16. The apparatus of claim 14, wherein said gathered metadata is provided to said remote node state manager for storage comprises a callback message to said remote node state manager.

17. The apparatus of claim 14, wherein said at least one processing device is further configured to update a finite state machine to indicate a state of said node.

18. The apparatus of claim 14, wherein said at least one processing device is further configured to evaluate said gathered metadata to detect a change in state of said node.

19. The apparatus of claim 18, wherein said at least one processing device is further configured to reconcile said gathered metadata across a plurality of data domains.

20. The apparatus of claim 18, wherein said at least one processing device is further configured to evaluate said gathered metadata across one or more data domains to determine if a state of said node violates one or more predefined security constraints.

21. The apparatus of claim 14, wherein said gathered metadata is analyzed to guide one or more of a state machine and an installation process based on one or more operational policies.

* * * * *